United States Patent
Ren et al.

(10) Patent No.: US 12,462,794 B2
(45) Date of Patent: Nov. 4, 2025

(54) METHODS AND DEVICES FOR STRUCTURED PRUNING FOR AUTOMATIC SPEECH RECOGNITION

(71) Applicant: KWAI INC., Palo Alto, CA (US)

(72) Inventors: Yongxiong Ren, San Jose, CA (US); Bingbing Li, Stafford Spring, CT (US); Yang Liu, San Jose, CA (US); Lingzhi Liu, San Jose, CA (US)

(73) Assignee: BEIJING TRANSTREAMS TECHNOLOGY CO. LTD., Beijing (CN)

( * ) Notice: Subject to any disclaimer, the term of this patent is extended or adjusted under 35 U.S.C. 154(b) by 1021 days.

(21) Appl. No.: 17/212,891

(22) Filed: Mar. 25, 2021

(65) Prior Publication Data

US 2022/0310068 A1   Sep. 29, 2022

(51) Int. Cl.
*G10L 15/16* (2006.01)
*G06N 3/04* (2023.01)
*G06N 3/082* (2023.01)
*G10L 15/22* (2006.01)

(52) U.S. Cl.
CPC ............. *G10L 15/16* (2013.01); *G06N 3/04* (2013.01); *G06N 3/082* (2013.01); *G10L 15/22* (2013.01)

(58) Field of Classification Search
CPC ......... G10L 15/16; G10L 15/22; G10L 15/28; G10L 15/06; G06N 3/04; G06N 3/082; G06N 3/0455; G06N 3/0464; G06N 3/0495
See application file for complete search history.

(56) References Cited

U.S. PATENT DOCUMENTS

| | | | |
|---|---|---|---|
| 10,719,764 B2 | 7/2020 | Shazeer et al. | |
| 2016/0358069 A1* | 12/2016 | Brothers | G06F 7/764 |
| 2019/0130271 A1* | 5/2019 | Narang | G06N 3/082 |
| 2019/0392287 A1* | 12/2019 | Ovsiannikov | G06F 17/153 |

(Continued)

FOREIGN PATENT DOCUMENTS

CN   109726045 A   5/2019

OTHER PUBLICATIONS

Singh et al., "Acceleration of Deep Convolutional Neural Networks Using Adaptive Filter Pruning". (Year: 2020).*

(Continued)

*Primary Examiner* — Ryan C Vaughn
(74) *Attorney, Agent, or Firm* — Arch & Lake LLP; Hao Tan; Shen Wang (57) ABSTRACT

Methods and apparatuses for automatic speech recognition are provided. The method includes: generating a weight matrix for a layer of a plurality of layers in a neural network; dividing the weight matrix into a plurality of blocks, each block including a plurality of weights; selecting a set of blocks from the plurality of blocks for block-wise pruning by minimizing a cost function subject to a pre-determined block-wise constraint; and generating a block-wise pruned weight matrix by setting one or more weights in the set of blocks to zero. The weight matrix includes a set of weights associated with the layer, the plurality of layers includes a first layer receiving a first input associated with one or more audio feature sequences, and the plurality of layers are executed on one or more processors.

20 Claims, 9 Drawing Sheets

(56) References Cited

U.S. PATENT DOCUMENTS

2021/0065052 A1* 3/2021 Muralidharan .......... G06N 7/01
2021/0125071 A1* 4/2021 Ren .......................... G06N 3/04

OTHER PUBLICATIONS

Vaswani, Ashish et al., "Attention Is All You Need" Computation and Language (cs.CL); Machine Learning (cs.LG), arXiv: 1706.03762, https://doi.org/10.48550/arXiv. 1706.03762, (15p).
Gulati, Anmol, et al., "Conformer: Convolution-augmented Transformer for Speech Recognition", Google Inc., May 16, 2020, (5p).
Zhao, Yuanyuan, et al. "The Speechtransformer For Large-Scale Mandarin Chinese Speech Recognition", IEEE Xplore, Nov. 4, 2020, (5p).
Zhang, Tianyun et al., "A Systematic DNN Weight Pruning Framework using Alternating Direction Method of Multipliers", ECCV 2018 SpringerLink: https://link.springer.com/conference/eccv, (16p).
Zhang, Tianyun et al., "A Unified DNN Weight Compression Framework Using Reweighted Optimization Methods", Apr. 12, 2020, (9p).
Narang, Sharan et al., "Block-Sparse Recurrent Neural Networks", Nov. 8, 2017 (12p).

* cited by examiner

METHODS AND DEVICES FOR STRUCTURED PRUNING FOR AUTOMATIC SPEECH RECOGNITION

FIELD

The present disclosure relates to automatic speech recognition (ASR), and in particular but not limited to, a structured pruning method for ASR model acceleration and related hardware devices.

BACKGROUND

ASR which allows the derivation of the transcription (word sequence) of an utterance given the speech waveform, has found its importance in many service applications, such as voice transcription, audio search, content review, and live streaming. One of the important ASR approaches is to use an attention-mechanism based transformer model, namely the speech transformer, which predicts a word sequence by capturing long-term dependencies and wide-range context information. It may outperform the previously de facto ASR choice, i.e., recurrent neural networks that can model the temporal dependencies in the audio sequence effectively. It may also outperform convolutional neural network (CNN) based models.

While the speech transformer has achieved excellent word/character error rate performance for both English and Chinese ASR and is good at modeling long-range global context, it is less capable of extracting fine-grained local feature patterns. CNN models, on the other hand, exploit local information and are used as the de-facto computational block in vision. They learn shared position-based kernels over a local window, thus maintaining translation equivariance and ability to capture features like edges and shapes. However, CNN models have limited capability in capturing dynamic global context.

A conformer model is built on the combination of convolution and self-attention, such that it may learn both pointwise local features and use content-based global interaction. A conformer model may show state-of-the-art performance in English ASR and may potentially outperform the speech transformer in Chinese ASR. However, it requires a significant amount of power and computation resources to process every audio corpus. There is a major technical challenge in real deployments to efficiently accelerate the ASR conformer model on hardware devices, for example, graphic processing units (GPUs).

SUMMARY

The present disclosure describes examples of techniques relating to accelerating a model inference based on structured pruning methods.

According to a first aspect of the present disclosure, there is provided a method for automatic speech recognition. The method includes generating a weight matrix for a layer of a plurality of layers in a neural network. The weight matrix includes a set of weights associated with the layer, the plurality of layers includes a first layer receiving a first input associated with one or more audio feature sequences, and the plurality of layers are executed on one or more processors.

The method further includes dividing the weight matrix into a plurality of blocks. Each block includes a plurality of weights. A set of blocks are selected from the plurality of blocks for block-wise pruning by minimizing a cost function subject to a pre-determined block-wise constraint. Furthermore, the method includes generating a block-wise pruned weight matrix by setting one or more weights in the set of blocks to zero.

According to a second aspect of the present disclosure, there is provided an apparatus for automatic speech recognition. The apparatus includes one or more processors and a memory configured to store instructions executable by the one or more processors. The one or more processors, upon execution of the instructions, are configured to generate a weight matrix for a layer of a plurality of layers in a neural network. The weight matrix includes a set of weights associated with the layer. The plurality of layers includes a first layer receiving a first input associated with one or more audio feature sequences, and the plurality of layers are executed on the one or more processors.

The one or more processors are further configured to divide the weight matrix into a plurality of blocks. Each block includes a plurality of weights. Further, a set of blocks are selected from the plurality of blocks for block-wise pruning by minimizing a cost function subject to a pre-determined block-wise constraint. The one or more processors are further configured to generate a block-wise pruned weight matrix by setting one or more weights in the set of blocks to zero.

According to a third aspect of the present disclosure, there is provided a non-transitory computer readable storage medium, including instructions stored therein, where, upon execution of the instructions by one or more processors, the instructions cause the one or more processors to perform acts including: generating a weight matrix for a layer of a plurality of layers in a neural network. The weight matrix includes a set of weights associated with the layer, the plurality of layers includes a first layer receiving a first input associated with one or more audio feature sequences, and the plurality of layers are executed on the one or more processors.

The instructions cause the one or more processors to perform acts further including dividing the weight matrix into a plurality of blocks. Each block includes a plurality of weights. Further, a set of blocks are selected from the plurality of blocks for block-wise pruning by minimizing a cost function subject to a pre-determined block-wise constraint. The instructions cause the one or more processors to perform acts further including generating a block-wise pruned weight matrix by setting one or more weights in the set of blocks to zero.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if they appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
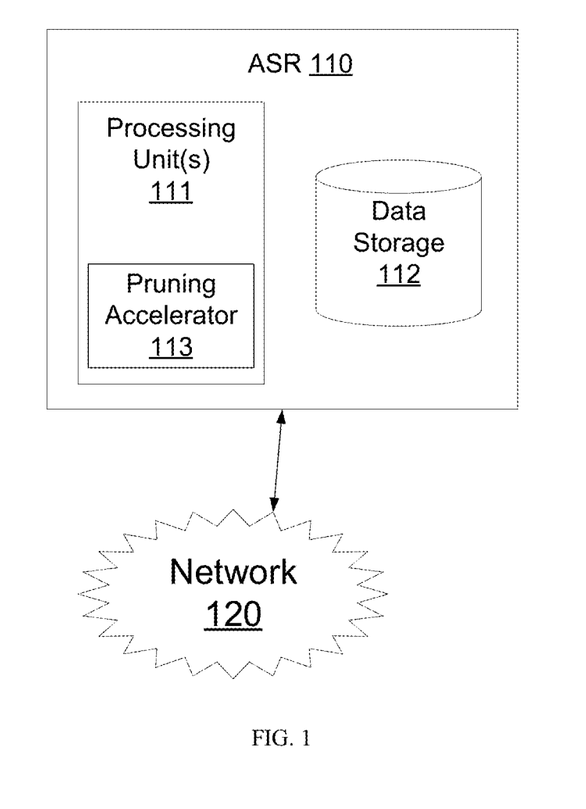
FIG. 1 illustrates an ASR system configured to implement one or more embodiments according to the present disclosure.

FIG. 1 illustrates an ASR system configured to implement one or more embodiments according to the present disclosure. As shown, the ASR system 110 is communicating with a network 120. The ASR system 110 may include one or more processing units 111 and one or more data storages 112. The one or more processing units 111 may include a pruning accelerator 113.

In some embodiments, the one or more processing units 111 may include any technically feasible hardware units configured to process data and execute software applications. For example, a processing unit may be any parallel computing platform such as a GPU, Field Programmable Gate Arrays (FPGAs), or a tensor processing unit (TPU).

In some embodiments, the pruning accelerator 113 prunes a neural network in a training process so that the overall complexity of the neural network is reduced, and the computational and memory requirements associated with the neural network are reduced. The pruning accelerator 113 may select the neurons to be pruned from the neuron network and deactivate the selected neurons. The pruning accelerator 113 may also deactivate any connections in the neural network to the selected neurons.

In some embodiments, the pruning accelerator 113 may consider constraints of hardware implementation during the pruning process and thus achieve inference acceleration of the pruned model on the actual hardware platform. In some embodiments, the pruning accelerator 113 may add constraints to the pruning structure by using a heuristic algorithm and adjust the GPU calculation pipeline accordingly.

In some embodiments, the one or more data storages 112 may store training data and/or parameters related to training and/or pruning the neural network. The parameters may be used by the pruning accelerator 113 during the pruning of the neural network. The parameters may include, but are not limited to, weights of each layer of the neural network, number of neurons of each layer of the neural networks, etc.

The network 120 may be any type of communications network, such as a local area network (e.g., intranet), wide area network (e.g., Internet), or some combination thereof and can include any number of wired or wireless links. Communication over the network 120 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some embodiments, the neural network may include a plurality of layers. For example, the neural network may include N layers including layer $L_1$, layer $L_2$, . . . , layer $L_{N-1}$, and layer $L_N$. Each layer Ln may be related to a weight matrix Wn, where n is a positive integer between 1 and N. In some embodiments, each layer Ln may be initialized with an initial weight matrix $W_n$ by using a pre-determined algorithm which returns a matrix of random numbers drawn from a normal distribution with mean 0 and variance 1.

Figure 3:
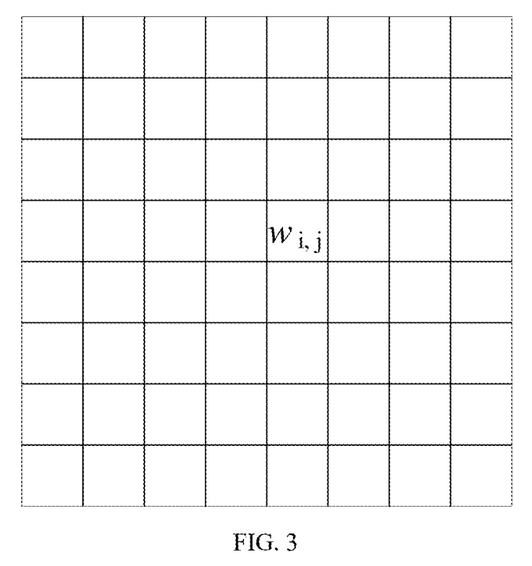
FIG. 3 illustrates a weight matrix associated with a layer in a neural network according to the present disclosure.

In some embodiments, the plurality of layers in the neural network may include one or more fully-connected (FC) layers. In an FC layer, weights related to the FC layer may be organized in a two-dimensional matrix. For example, the n-th layer $L_n$ is an FC layer and its weight matrix may be denoted by $W_n$. In some embodiments, the weight matrix $W_n$ of the n-th layer $L_n$ may include a plurality of rows and a plurality of columns. The number of rows may be denoted by y and the number of columns may be denoted by x, where y and x are positive integers. Thus, the weight matrix $W_n$ is a matrix of a dimension of x×y. The number of columns x equals the number of neurons included in the layer $L_n$. The number of rows y may equal the number of neurons included in the layer $L_{n+1}$ that subsequently follows the layer $L_n$. FIG. 3 illustrates a weight matrix associated with a layer in a neural network according to the present disclosure. A matrix element denoted as $w_{i,j}$ indicates a weight associated with a layer.

In some embodiments, the plurality of layers in the neural network may include one or more convolutional layers. In a convolutional layer, weights may be organized in a three-dimensional tensor. The size of the three-dimensional weight tensor may be related to a size of a filter/kernel in the convolutional layer, channel of an input image, etc. For example, the n-th layer $L_n$ is a convolutional layer and its weight tensor may be denoted by Tn. The convolutional layer $L_n$ may have a plurality of kernels. For example, the number of kernels that are included in the convolutional layer $L_n$ is k, where k is a positive integer. The width of every kernel is d, and the depth of every kernel or the number of channels of the input image is p. In some embodiments, the three-dimensional weight tensor Tn of the convolutional layer $L_n$ may have a size of $d^2 \times p \times k$, where k, d, and p are respectively positive integers.

Figure 9:
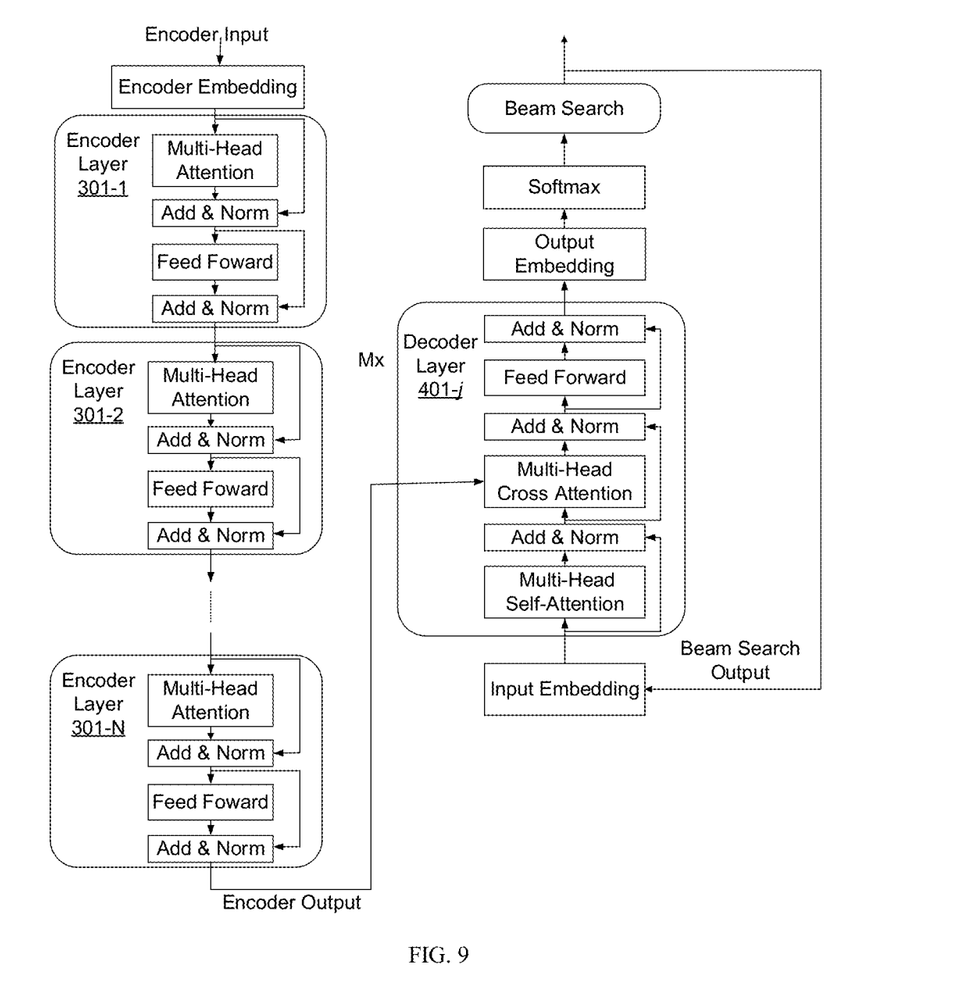
FIG. 9 illustrates a speech transformer according to the present disclosure.

In some embodiments, the neural network may use a transformer architecture, as shown in FIG. 9. FIG. 9 illustrates a speech transformer model according to the present disclosure. The transformer may include an encoder and a decoder. The encoder may include a plurality of encoder layers (301-1, 301-2, . . . , 301-N) and the decoder may include a plurality of decoder layers 401-j, where j may be a positive integer between 1 and M, and M and N are positive integers. Each of the encoder layers and each of the decoder layers may respectively include a plurality of FC layers. As shown in FIG. 9, each encoder layer may include a multi-head module having multiple FC layers. Each encoder layer may also include a feed forward module having multiple FC layers. Each encoder layer may also include multiple add & norm layers. Each decoder layer may also include a multi-head cross attention module, a multi-head self-attention module, a feed forward module, and a plurality of add & norm layers. These modules may respectively further include multiple FC layers. Each of these FC layers may be associated with a weight matrix.

Figure 10:
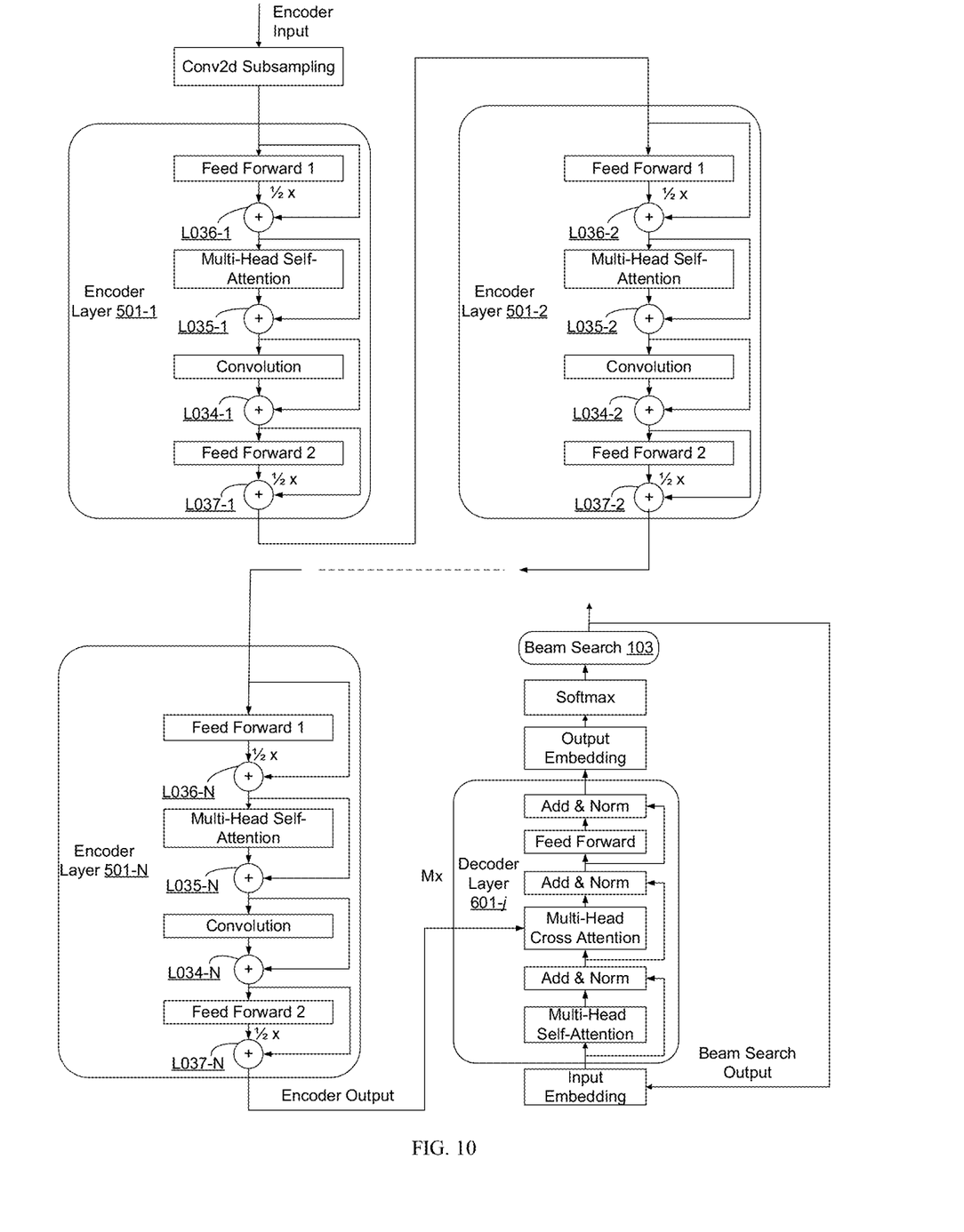
FIG. 10 illustrates a speech conformer according to the present disclosure.

In some embodiments, the neural network may use a conformer architecture, as shown in FIG. 10. FIG. 10 illustrates a speech conformer model according to the present disclosure. The conformer may include an encoder and a decoder. The encoder may include a plurality of encoder layers (501-1, 501-2, . . . , 501-N) and the decoder may include a plurality of decoder layers 601-j, where j may be a positive integer between 1 and M, and M and N are positive integers. Each encoder layer 501-i (i is a positive integer between 1 and N) may include two feed forward modules, a multi-head self-attention module, and a convolution module, and a plurality of residual connections including L035-i, L034-i, L036-i, and L037-i. The convolution module may include a plurality of convolutional layers. Each of the plurality of convolutional layers may be associated with a three-dimensional weight tensor. The feed forward modules and the multi-head self-attention module may include a plurality of FC layers. Each of the plurality of FC layers may be associated with a two-dimensional weight matrix.

Further, each decoder layer 601-j may include a multi-head cross attention module, a multi-head self-attention module, a feed forward module, and a plurality of add & norm layers. These modules may respectively further include multiple FC layers. Each of these FC layers may be associated with a weight matrix.

In some embodiments, the plurality of encoder layers of the transformer or the conformer may be sequentially executed on one or more GPUs. The one or more audio feature sequences may be parallelly sent or fed to the first encoder layer. After the first encoder layer receives all the one or more audio feature sequences, a first encoder layer output is generated and sent to the next encoder layer. The next encoder layer receives the first encoder layer output, generates an intermediate encoder layer output and sends to a following encoder layer. As such, each intermediate encoder layer receives an output from a previous encoder layer and then sends a generated output to a following intermediate encoder layer. The last intermediate encoder layer sends its output to the last encoder layer and the last encoder layer generates an encoder output and sends the encoder output to a decoder layer.

In some embodiments, the decoder of the transformer or the conformer processes batch data in a step-by-step fashion. Each computation only outputs one symbol, that is, one word or character. For example, the first decoder layer calculates at a first time step t, and the next decoder layer, the second decoder layer, then calculates at a second time step t+1, where t may indicate a time. For one time step, all the decoder sublayers will be calculated sequentially. As shown in FIGS. 9 and 10, the decoder layer output of the decoder layer is sent to a layer output embedding and a layer of softmax, and then sent to a beam search module including a plurality of layers.

In some embodiments, the pruning accelerator 113, as shown in FIG. 1, may prune weight matrices or tensors of a neural network in a training process so that the overall complexity of the neural network is reduced, and the computational and memory requirements associated with the neural network are reduced. In some embodiments, the block-wise pruning of the weight matrices may be implemented based on blocks. Block-wise weight pruning gains significantly in weight storage reduction and computation efficiency. In some embodiments, block-wise weight pruning is implemented by dividing a weight matrix into a plurality of blocks, selecting some blocks from the plurality of blocks according to a heuristic algorithm which uses a block-wise constraint on the number of blocks remained, and deactivating the selected blocks by setting all weights in the selected blocks to zero.

Figure 2:
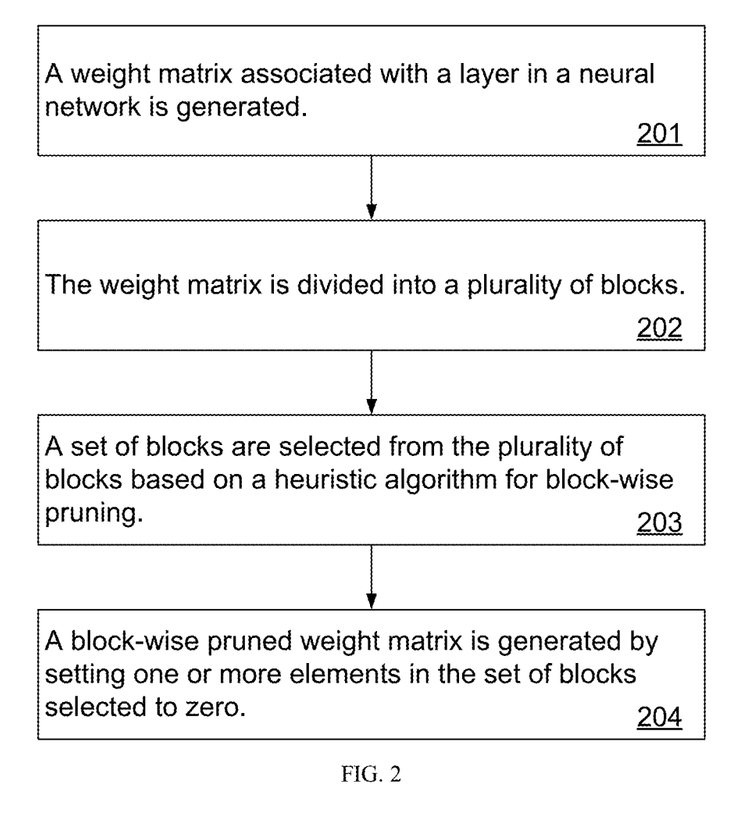
FIG. 2 is a flowchart illustrating an exemplary process of block-wise pruning of a weight matrix according to the present disclosure.

FIG. 2 is a flowchart illustrating an exemplary process of block-wise pruning of a weight matrix according to the present disclosure. As shown in FIG. 2, the method may include, but is not limited to, the shown steps. The method of pruning may be implemented in a training process of the neural network to reduce parameter numbers of the neural network, so that the overall complexity of the neural network, and the computational and memory requirements associated with the neural network, are reduced.

In step 201, a weight matrix associated with a layer in a neural network is generated. The neural network may include a plurality of layers. The layer to which the weight matrix is related is one layer of the plurality of layers. The plurality of layers may include convolutional layers, FC layers, attention layers, etc.

In some embodiments, the weight matrix may include a plurality of rows and a plurality of columns. The number of rows may be denoted by y and the number of columns may be denoted by x, where y and x are positive integers. Thus, the weight matrix $W_n$ is a matrix of x×y. The number of columns x may equal the number of neurons included in the layer $L_n$. The number of rows y may equal the number of neurons included in the next layer $L_{n+1}$ that subsequently follows the layer $L_n$. Elements in the weight matrix $W_n$ respectively correspond to weight parameters of the layer $L_n$. As shown in FIG. 3, the weight matrix $W_{8\times8}$ is a matrix of 8×8, $w_{i,j}$ is one element of the weight matrix $W_{8\times8}$ at the position of row i and column j, and $w_{i,j}$ is corresponding to a weight parameter of the layer $L_n$. In some embodiments, the number of rows y and the number of columns x do not have to be the same as shown in FIG. 3.

In some embodiments, when a layer $L_n$ of the neural network is a convolutional layer, weights are organized initially as a three-dimensional weight tensor $T_n$. The step 201 may further include: transforming the three-dimensional weight tensor $T_n$ to a two-dimensional weight matrix $W_n$ including a plurality of rows and a plurality of columns.

Figure 7:
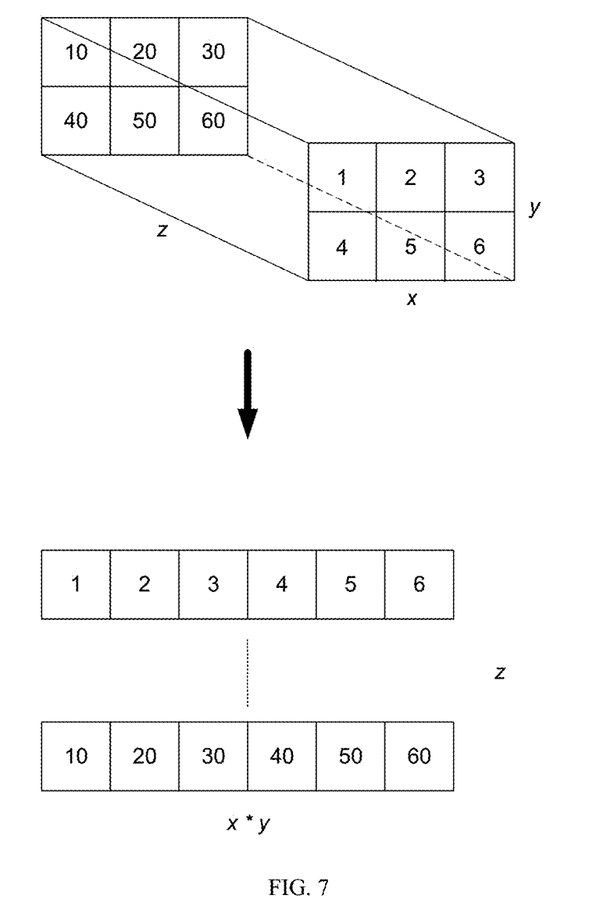
FIG. 7 illustrates a transformation from a three-dimensional weight tensor to a two-dimensional weight matrix according to the present disclosure.

FIG. 7 illustrates a transformation from a three-dimensional weight tensor to a two-dimensional weight matrix according to the present disclosure. The size of the three-dimensional weight tensor may be related to a size of a filter/kernel in the convolutional layer, channels of an input image, etc. As shown in FIG. 7, the three-dimensional weight tensor In has a size of x×y×z, where x, y, and z are positive integers. In step 201, the three-dimensional weight tensor $T_n$ is transformed into a two-dimensional weight matrix $W_n$ having a size of (x×y)×z. The two-dimensional weight matrix $W_n$ includes z rows and (x×y) columns. The size of the three-dimensional weight tensor and the size of the two-dimensional weight matrix are not limited to the sizes illustrated in FIG. 7.

In some embodiments, x may be related to the width of every kernel included in the convolutional layer. For example, the width of every kernel is d and x equals $d^2$. In some embodiments, y may be related to the depth of every kernel included in the convolutional layer or the number of channels of the input image. For example, the depth of every kernel is p and y equals p. In some embodiments, z may be related to the number of kernels included in the convolutional layer. For example, the number of kernels included in the convolutional layer is k and z equals k.

In step 202, the weight matrix is divided into a plurality of blocks.

In some embodiments, each block may include s columns and t rows, where s and t are positive integers, s is no greater than x, and t is no greater than y. Each block accordingly may include s×t weight parameters of the layer. In some embodiments, s and t are the same and the block is a square block. In some embodiments, s and t are different from each other.

In some embodiments, each of the plurality blocks does not have to be of the same size.

Figure 8:
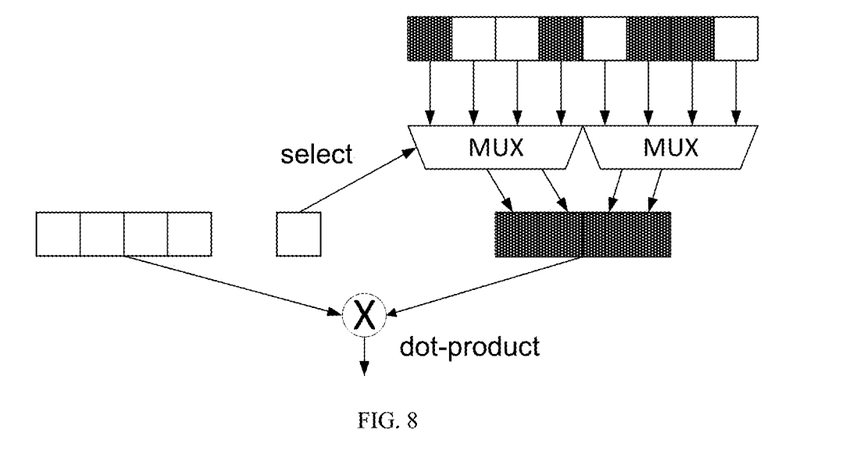
FIG. 8 illustrates training over tensor processing units according to the present disclosure.

In some embodiments, the determination of the size of each block is compatible with parallel computing platforms. For example, the size of each block is compatible with tensor core units in implementing matrix multiplication, as shown in FIG. 8. In some embodiments, the divided blocks may be directly computed/deployed on the tensor core units because the size of each block is compatible with the tensor core units.

In some embodiments, a user can determine the block size, e.g. 2×2, 3×3, 4×4, 5×5, 8×10, etc.

Figure 4:
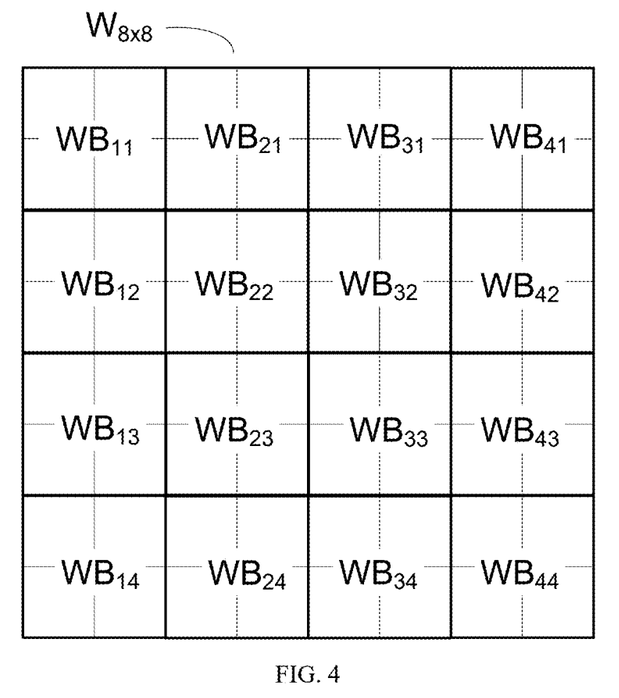
FIG. 4 illustrates dividing a weight matrix into a plurality of blocks according to the present disclosure.

As shown in FIG. 4, the weight matrix $W_{8\times8}$ is divided into a plurality of blocks $WB_{ij}$, where i and j are positive integers between 1 and 8. Each of the blocks $WB_{ij}$ has a size of 2×2 and include four elements respectively corresponding to fours weight parameters of the layer. The plurality of blocks $WB_{ij}$ are accordingly organized in a matrix of 4×4 including elements $WB_{11}$, $WB_{12}$, . . . , $WB_{44}$, as shown in FIG. 4.

In step 203, a set of blocks are selected from the plurality of blocks based on a heuristic algorithm for block-wise pruning.

In some embodiments, the heuristic algorithm is subject to a pre-determined block-wise constraint associated with the plurality of blocks.

In step 204, a block-wise pruned weight matrix is generated by setting one or more elements in the set of blocks selected to zero.

In some embodiments, the block-wise pruning is implemented by setting all elements corresponding to weight parameters in the set of blocks selected to zero. The pre-determined block-wise constraint may be a constraint on the number of remaining non-zero blocks. The remaining blocks are blocks that are not selected in step 203 and remain non-zero.

Figure 5:
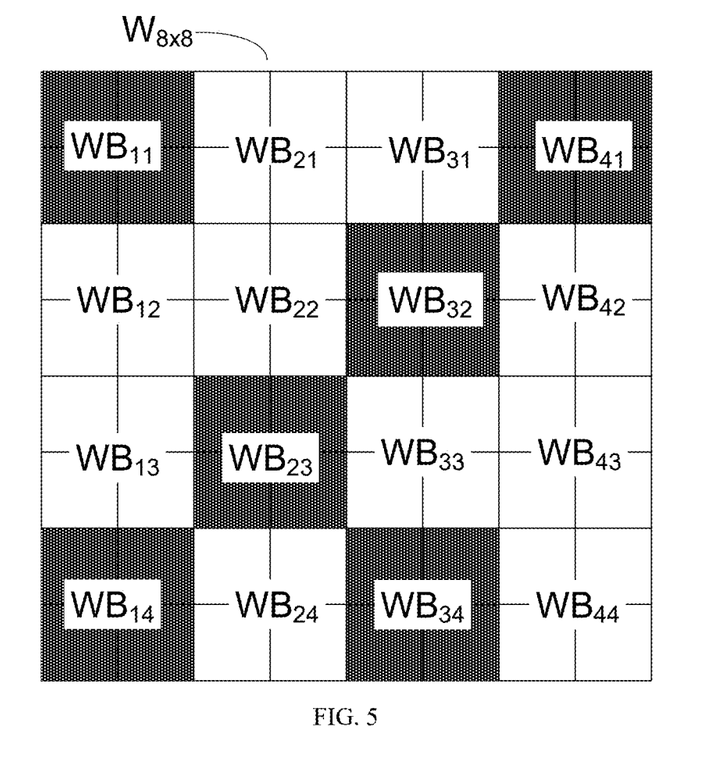
FIG. 5 illustrates selecting a set of blocks for block-wise pruning based on a heuristic algorithm according to the present disclosure.

FIG. 5 illustrates selecting a set of blocks for block-wise pruning based on a heuristic algorithm according to the present disclosure. As shown in FIG. 5, a set of blocks including $WB_{21}$, $WB_{31}$, $WB_{12}$, $WB_{22}$, $WB_{42}$, $WB_{13}$, $WB_{33}$, $WB_{43}$, $WB_{24}$, and $WB_{44}$ are selected based on the pre-determined block-wise constraint of the heuristic algorithm. All weights in the set of blocks are set to be zero. The remaining blocks include $WB_{11}$, $WB_{41}$, $WB_{32}$, $WB_{23}$, $WB_{14}$, and $WB_{34}$. At least one weight in the remaining blocks remains non-zero. In some embodiments, at least one weight in each of the remaining blocks remains non-zero. In some embodiments, all weights in the remaining blocks remain non-zero. The numbers of the set of blocks and the remaining blocks are not limited to the numbers as illustrated in FIG. 5 and are determined based on the heuristic algorithm.

In some embodiments, at least one block in each row of the divided block-wise matrix remains non-zero. A block remaining non-zero requires at least one weight in the block remains non-zero. As shown in FIG. 5, the weight matrix $W_{8\times8}$ is divided into 16 blocks. The 16 blocks are arranged in a 4×4 matrix. For each row of the 4×4 matrix, at least one block remains non-zero. For example, in the row including blocks $WB_{11}$, $WB_{21}$, $WB_{31}$, and $WB_{41}$, at least one block remains zero, thus ensuring effective input to the layer and leading to increased accuracy.

As shown in FIG. 9, the neural network may be a transformer including N layers, where N is a positive integer. An input of the transformer may include one or more audio feature sequences. Weight matrix of the n-th layer is denoted as $W_n$. Bias of the n-th layer is denoted as bn. After dividing the weight matrix $W_n$ into a plurality of blocks, a matrix WB of the plurality of blocks, as shown in FIG. 4, is obtained. The total loss of the neural network may be denoted as: $f(\{W_n\}_{n=1}^N, \{b_n\}_{n=1})$. The training of the neural network is a process of minimizing the loss by updating weights $W_n$ and biases bn.

In some embodiments, the training process minimizes the total loss by solving:

$$\min_{\{W_n\},\{b_n\}} f(\{W_n\}_{n=1}^N, \{b_n\}_{n=1}^N)$$

subject to: number of non-zero blocks in WB is no greater than $l_n$, n=1, ..., N.

where $l_n$ is a desired number of non-zero blocks in the n-th layer $L_n$. By using the block-wise constraint on number of non-zero blocks remaining, that is, the number of non-zero blocks remaining is no greater than a pre-determined threshold number $l_n$, a set of blocks other than the non-zero blocks is selected for pruning. In some embodiments, each entire block of the set of blocks selected in step 203 is set to zero. That is, all elements corresponding to weight parameters in the set of blocks selected in step 203 are set to be zero.

In some embodiments, hard constraints are relaxed by adding regularization terms, so as to apply on natural language processing models. To reduce the number of non-zero elements in the weight matrix $W_n$ of the n-th layer in the neural network while maintaining the accuracy, the regularization term is as follows:

$$\lambda \sum_{n=1}^{N} \sum_{i=1}^{p_n} \sum_{j=1}^{q_n} (W_n)_{ij}^2$$

where $\lambda$ is a penalty parameter, $p_n$ is the number of rows in the weight matrix $W_n$ of the layer $L_n$, and $q_n$ is the number of blocks in a row of $W_n$. And the block pruning problem solves:

$$\min_{\{W_n\},\{b_n\}} f(\{W_n\}_{n=1}^N, \{b_n\}_{n=1}^N) + \lambda \sum_{n=1}^{N} \sum_{i=1}^{p_n} \sum_{j=1}^{q_n} \gamma_{i,j}(W_n)_{ij}^2$$

where $\gamma_{i,j}$ is the penalty weight corresponding to the j-th block in the i-th row, and it is updated by $\gamma_{i,j}=1/(\sqrt{(W_n)_{ij}^2+\epsilon})$, where $\epsilon$ is a small value preventing division by zero. The penalty weight $\gamma_{i,j}$ is initialized by using parameters in a pre-trained model. One or more blocks may be selected for pruning when the corresponding regularization term is smaller than a threshold after weight training.

In some embodiments, transformer models are refined by using non-zero weights. $\lambda$ is used for adjusting regularization strength. When $\lambda$ is too small, the reweighted training is close to the original training. When $\lambda$ is too large, it gives too much penalty on the weights and accuracy cannot be maintained. For example, reweighted training may be started with $\lambda=0$ to reproduce the original results and increase $\lambda$ to derive sparsity of the weight matrices. Increasing $\lambda$ may be stopped when the reweighted training accuracy drops slightly and the accuracy will be improved after retraining.

In some embodiments, the block-wise pruning is implemented by applying block-wise row pruning and/or block-wise column pruning on the plurality of blocks that are obtained in step 202. The pre-determined block-wise row and/or column constraint may be a constraint on the number of remaining non-zero rows in the plurality of blocks and/or a constraint on the number of remaining non-zero columns in the plurality of blocks. The set of blocks selected in step 203 includes a plurality of rows and/or columns selected for pruning, that is, for setting to be zero. The remaining non-zero rows and/or non-zero columns are respectively rows and/or columns other than the plurality of rows and/or columns selected for pruning in each block.

Figure 6:
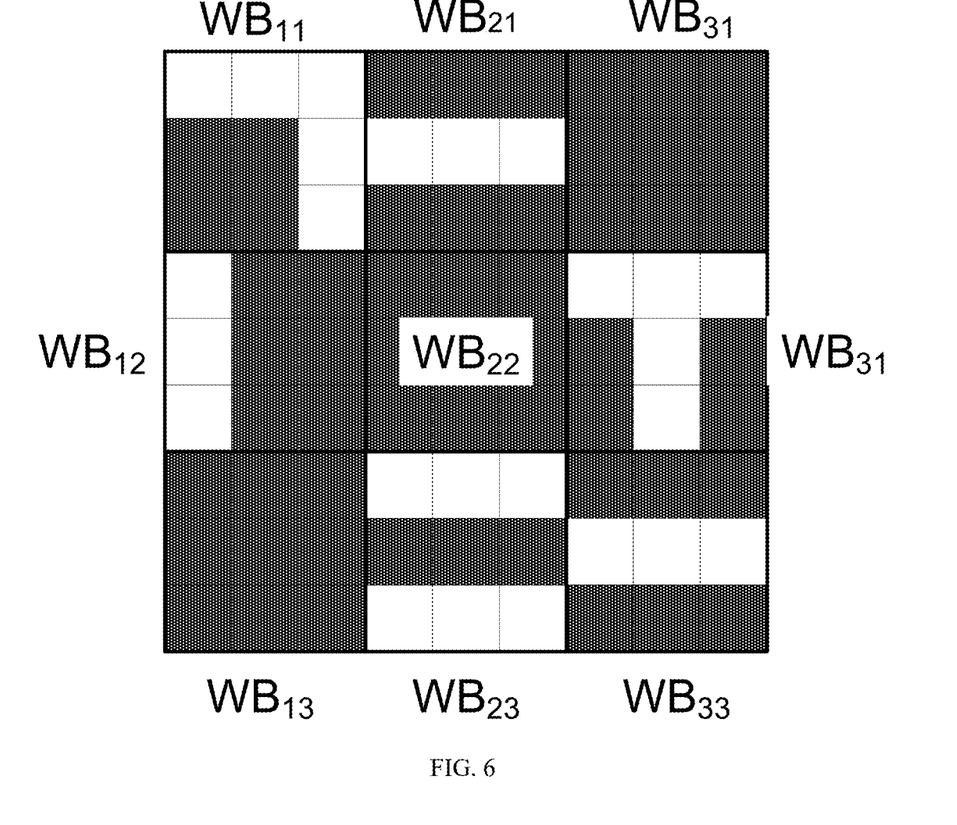
FIG. 6 illustrates block-wise row and column pruning according to the present disclosure.

FIG. 6 illustrates block-wise row and column pruning according to the present disclosure. As shown in FIG. 6, a weight matrix of a layer in the neural network is denoted as $W_{9\times9}$ including 9 rows and 9 columns. The weight matrix $W_{9\times9}$ is divided into 9 blocks including $WB_{11}$, $WB_{21}$, ..., $WB_{33}$, as shown in FIG. 6. The 9 blocks are organized as a 3×3 matrix. Each block includes 3 rows and 3 columns. During the row and/or column pruning, some rows and/or columns in the plurality of blocks are selected based on the pre-determined block-wise row and/or column constraint on non-zero row number and/or non-zero column number in each block. As shown in FIG. 6, a length of each row in each block is smaller than a length of each row in the weight matrix $W_{9\times9}$ of the layer. The length of each row in each block is 3 while the length of each row in the weight matrix $W_{9\times9}$ of the layer is 9.

For example, as shown in FIG. 6, for the block WB11 in the top left corner, one row (the top row that is blank) and one column (the right column that is blank) in the block WB11 are selected and all elements corresponding to weight parameters in the row and the column selected are set to be zero. Other elements corresponding to weight parameters in the block WB11, that is, the four elements that are black, may remain non-zero.

Further, for the block WB31 in the top right corner, no row or column in the block WB31 is selected and all elements corresponding to weight parameters in the block WB31 remain non-zero. The number and distribution of selected rows and/or columns are not limited to the number and distribution as illustrated in FIG. 6 and are determined based on the heuristic algorithm.

In some embodiments, the row and column the training process solves:

$$\min_{\{W_n\},\{b_n\}} f(\{W_n\}_{n=1}^N, \{b_n\}_{n=1}^N)$$

subject to: number of non-zero rows in blocks is no greater than $r_i$;
and/or number of non-zero columns in blocks is no greater than $c_i$, i=1, ..., N.

where $r_i$ is a desired number of non-zero rows in blocks, and ci is a desired number of non-zero columns in blocks. By using the block-wise row constraint on non-zero rows in blocks, that is, the number of the non-zero rows in blocks corresponding to a layer is no greater than a pre-determined threshold number, the selected rows remain zero while other elements not in the selected row remain non-zero. For example, all elements corresponding to weight parameters in the set of rows selected are set to be zero and other elements corresponding to weight parameters in the rows other than the set of rows selected remain non-zero. Further, by using the block-wise constraint on non-zero columns in blocks, that is, the number of the non-zero columns in blocks corresponding to a layer is no greater than a pre-determined threshold number, a set of columns in blocks are selected and all elements corresponding to weight parameters in the set of columns selected are set to be zero. Other elements corresponding to weight parameters in the columns other than the set of columns selected remain non-zero.

In some embodiments, in the block-wise row and/or column pruning, hard constraints are also relaxed by adding regularization terms, so as to apply on natural language processing models. In some embodiments, reweighted penalty parameters for different blocks are used to achieve a higher compression rate under same accuracy requirement than using a fixed penalty parameter in group lasso regularization.

In some embodiments, the regularization term for block row pruning is:

$$\sum_{n=1}^{N}\sum_{i=1}^{p_n}\sum_{\alpha=1}^{q_n}\sqrt{\sum_{j=(\alpha-1)h_n+1}^{\alpha b_n}(W_n)_{ij}^2}$$

where $h_n$ is the block row size in the n-th layer, $p_n$ is the number of rows in the weight matrix $W_n$ of the layer $L_n$, and qn is the number of blocks in a row of $W_n$. The block-wise row pruning problem is:

$$\min_{\{W_n\},\{b_n\}} f\left(\{W_n\}_{n=1}^N, \{b_n\}_{n=1}^N\right) + \lambda \sum_{n=1}^{N}\sum_{i=1}^{p_n}\sum_{\alpha=1}^{q_n}\gamma_{i,\alpha}\sqrt{\sum_{j=(\alpha-1)h_n+1}^{\alpha h_n}(W_n)_{ij}^2},$$

where $\lambda$ is a penalty parameter, $\gamma_{i,\alpha}$ is the penalty weight corresponding to the $\alpha$-th block in the i-th row, and $\gamma_{i,\alpha}$ is updated by $\gamma_{i,\alpha}=1/(\sqrt{\Sigma_{j=(\alpha-1)/hn+1}^{\alpha h_n}(W_n)_{ij}^2}+\epsilon)$, where $\epsilon$ is a small value preventing division by zero.

In some embodiments, the block-wise column pruning problem is:

$$\min_{\{W_n\},\{b_n\}} f\left(\{W_n\}_{n=1}^N, \{b_n\}_{n=1}^N\right) + \lambda \sum_{n=1}^{N}\sum_{i=1}^{r_n}\sum_{\beta=1}^{s_n}\gamma_{j,\beta}\sqrt{\sum_{i=(\beta-1)d_n+1}^{\beta d_n}(W_n)_{ij}^2},$$

where $d_n$ is the block column size in the n-th layer, $r_n$ is the number of columns in $W_n$, $s_n$ is the number of blocks in a column of $W_n$, $\gamma_{j,\beta}$ is the penalty weight corresponding to the $\beta$-th block in the j-th column and is updated by $\gamma_{j,\beta}=1/(\sqrt{\Sigma_{j=(\alpha-1)/hn+1}^{h_n}\beta^{h_n}(W_n)_{ij}^2}+\epsilon)$. The penalty weights, $\gamma_{i,\alpha}$ and $\gamma_{j,\beta}$, are initialized by using parameters in a pre-trained model. One or more rows or columns in blocks may be selected for pruning when the corresponding regularization term is smaller than a threshold after weight training. The one or more rows or columns in blocks may be selected for pruning according to amplitudes of the one or more rows or columns. If an amplitude is smaller than a threshold, then the corresponding row or column will be selected for pruning.

In some embodiments, transformer models are refined by using the non-zero weights. $\lambda$ is used for adjusting regularization strength. When $\lambda$ is too small, the reweighted training is close to the original training. When $\lambda$ is too large, it gives too much penalties on the weights and accuracy cannot be maintained. For example, reweighted training may be started with $\lambda=0$ to reproduce the original results and increase $\lambda$ to derive sparsity of the weight matrices. Increasing $\lambda$ may be stopped when the reweighted training accuracy drops slightly and the accuracy will be improved after retraining.

Figure 11:
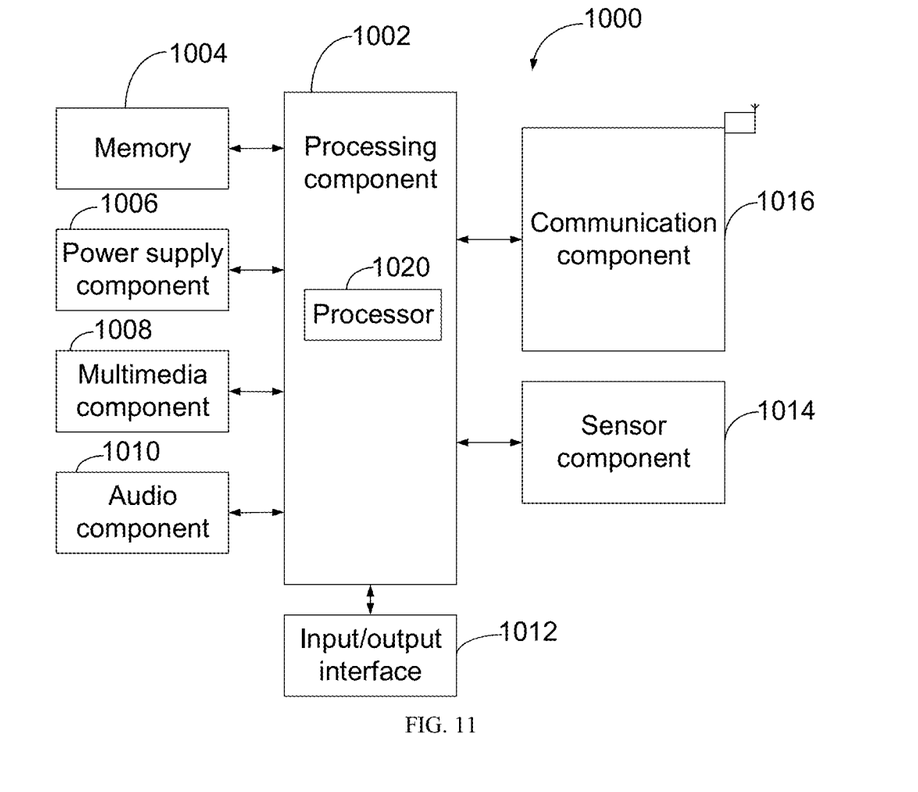
FIG. 11 is a block diagram illustrating an automatic speech recognition system the present disclosure.

FIG. 11 is a block diagram illustrating an automatic speech recognition system according to the present disclosure. The system 1000 may be a terminal, such as a mobile phone, a tablet computer, a digital broadcast terminal, a tablet device, or a personal digital assistant.

As shown in FIG. 11, the system 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 usually controls overall operations of the system 1000, such as operations relating to display, a telephone call, data communication, a camera operation and a recording operation. The processing component 1002 may include one or more processors 1020 for executing instructions to complete all or a part of the steps of the above method. The processors 1020 may include a CPU, GPU, DSP, or other processors. Further, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store different types of data to support operations of the system 1000. Examples of such data include instructions, contact data, phonebook data, messages, pictures, videos, and so on for any application or method that operates on the system 1000. The memory 1004 may be implemented by any type of volatile or non-volatile storage devices or a combination thereof, and the memory 1004 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1006 supplies power for different components of the system 1000. The power supply component 1006 may include a power supply management system, one or more power supplies, and other components associated with generating, managing and distributing power for the system 1000.

The multimedia component 1008 includes a screen providing an output interface between the system 1000 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1008 may include a front camera and/or a rear camera. When the system 1000 is in an operation mode, such as a shooting mode or a video mode, the front camera and/or the rear camera may receive external multimedia data.

The audio component 1010 is configured to output and/or input an audio signal. For example, the audio component 1010 includes a microphone (MIC). When the system 1000 is in an operating mode, such as a call mode, a recording mode and a voice recognition mode, the microphone is configured to receive an external audio signal. The received audio signal may be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module may be a keyboard, a click wheel, a button, or the like. These buttons may include but not limited to, a home button, a volume button, a start button and a lock button.

The sensor component 1014 includes one or more sensors for providing a state assessment in different aspects for the system 1000. For example, the sensor component 1014 may detect an on/off state of the system 1000 and relative locations of components. For example, the components are a display and a keypad of the system 1000. The sensor component 1014 may also detect a position change of the system 1000 or a component of the system 1000, presence or absence of a contact of a user on the system 1000, an orientation or acceleration/deceleration of the system 1000, and a temperature change of system 1000. The sensor component 1014 may include a proximity sensor configured to detect presence of a nearby object without any physical touch. The sensor component 1014 may further include an optical sensor, such as a CMOS or CCD image sensor used in an imaging application. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the system 1000 and other devices. The system 1000 may access a wireless network based on a communication standard, such as Wi-Fi, 4G, or a combination thereof. In an example, the communication component 1016 receives a broadcast signal or broadcast related information from an external broadcast management system via a broadcast channel. In an example, the communication component 1016 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the system 1000 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

In some other examples, there is provided a non-transitory computer readable storage medium 1004, having instructions stored therein. When the instructions are executed by one or more processors 1020, the instructions cause the processor to perform a method as illustrated in FIG. 2.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for automatic speech recognition, comprising:
generating a weight matrix for a layer of a plurality of layers in a neural network, wherein the weight matrix comprises a set of weights associated with the layer, the plurality of layers comprises a first layer receiving a first input associated with one or more audio feature sequences, and the plurality of layers are executed on one or more processors;
transforming the weight matrix organized in a three-dimensional weight tensor to a two-dimensional weight matrix, wherein the three-dimensional tensor has a size that is based on a size of a kernel of the layer and channels of an input of the layer, wherein the size of the three-dimensional tensor is x×y×z, x indicates a square of a width of the kernel, y indicates a depth of the kernel or a number of channels of the input of the layer, z indicates a number of kernels included in the layer, and a size of the two-dimensional weight matrix is (x×y)×z;
dividing the two-dimensional weight matrix into a plurality of blocks based on tensor core units of the one or more processors, each block comprising a plurality of weight, wherein the plurality of blocks are directly deployed on the tensor core units of the one or more processors;
selecting, by a pruning accelerator, a set of blocks from the plurality of blocks for block-wise pruning by minimizing a cost function subject to a pre-determined block-wise constraint, wherein the pre-determined block-wise constraint comprises constraints of hardware implementation, and the cost function comprises regularization terms obtained from a penalty parameter and penalty weights;
adding, by the pruning accelerator and using a heuristic algorithm, the pre-determined block-wise constraint to a pruning structure based on the constraints of the hardware implementation, and
adjusting a Graphics Processing Unit (GPU) pipeline according to the pruning structure with the pre-determined block-wise constraints added; wherein a block-wise pruned weight matrix is generated by setting one or more weights in the set of blocks to zero,
wherein the heuristic algorithm adds the pre-determined block-wise constraint on a number of non-zero elements, wherein the pruning accelerator prunes the neural network by selecting neurons to be pruned based on the pre-determined block-wise constraint;
and
wherein the one or more audio feature sequences are generated from an external audio signal received from an audio component comprising a microphone.

2. The method of claim 1, further comprising:
obtaining one or more remaining blocks from the plurality of blocks, wherein the one or more remaining blocks are not included in the set of blocks, and at least one weight in the one or more remaining blocks remain non-zero;

wherein the pre-determined block-wise constraint is based on a number of the one or more remaining blocks; and wherein the block-wise pruned weight matrix is generated by setting the one or more weights in the set of blocks to zero comprises:

the block-wise pruned weight matrix is generated by setting all weights in the set of blocks to zero.

3. The method of claim 2, wherein the pre-determined block-wise constraint is based on the number of the one or more remaining blocks further comprises:

the pre-determined block-wise constraint comprises that the number of the one or more remaining blocks is no greater than a first pre-determined threshold.

4. The method of claim 1, wherein setting the one or more weights in the set of blocks to zero comprises:

selecting at least one row from the plurality of blocks by minimizing a cost function subject to a pre-determined block-wise row constraint, each block comprising a plurality of rows; and setting all weights in the at least one selected row to zero; and wherein the pre-determined block-wise row constraint is based on a number of one or more rows not selected from the plurality of blocks.

5. The method of claim 4, wherein the pre-determined block-wise row constraint is based on the number of the one or more rows not selected from the plurality of blocks further comprises:

the pre-determined block-wise row constraint comprises that the number of the one or more rows not selected is no greater than a second pre-determined threshold.

6. The method of claim 1, wherein setting the one or more weights in the set of blocks to zero comprises:

selecting at least one column from the plurality of blocks by minimizing a cost function subject to a pre-determined block-wise column constraint, each block comprising a plurality of columns; and setting all weights in the at least one selected column to zero; and wherein the pre-determined block-wise column constraint is based on a number of one or more columns not selected from the plurality of blocks.

7. The method of claim 6, wherein the pre-determined block-wise column constraint is based on the number of the one or more columns not selected from the plurality of blocks further comprises:

the pre-determined block-wise column constraint comprises that the number of the one or more columns not selected is no greater than a third pre-determined threshold.

8. The method of claim 1, wherein a size of each block is determined based on a size of a tensor core unit of the one or more processors.

9. The method of claim 1, wherein setting the one or more weights in the set of blocks to zero comprises:

selecting at least one column and at least one row from the plurality of blocks by minimizing a cost function subject to a pre-determined block-wise row and column constraint, wherein each block comprises a plurality of columns and a plurality of rows; and setting all weights in the at least one column and the at least one selected row to zero; and wherein the pre-determined block-wise row and column constraint comprises that a number of one or more columns not selected from the plurality of blocks and one or more rows not selected from the plurality of blocks is no greater than a fourth pre-determined threshold.

10. The method of claim 1, wherein the plurality of layers comprises a convolutional layer, and the method further comprises:

transforming a three-dimensional weight tensor of the convolutional layer to the weight matrix.

11. The method of claim 1, further comprising:

selecting the set of blocks from the plurality of blocks for block-wise pruning by using a regularization term, wherein the set of blocks are selected by updating the regularization term using one or more penalty weights.

12. An apparatus for automatic speech recognition, comprising:

one or more processors; and a memory configured to store instructions executable by the one or more processors;

wherein the one or more processors, upon execution of the instructions, are configured to:

generate a weight matrix for a layer of a plurality of layers in a neural network, wherein the weight matrix comprises a set of weights associated with the layer, the plurality of layers comprises a first layer receiving a first input associated with one or more audio feature sequences, and the plurality of layers are executed on the one or more processors;

transforming the weight matrix organized in a three-dimensional weight tensor to a two-dimensional weight matrix, wherein the three-dimensional tensor has a size that is based on a size of a kernel of the layer and channels of an input of the layer, wherein the size of the three-dimensional tensor is x×y×z, x indicates a square of a width of the kernel, y indicates a depth of the kernel or a number of channels of the input of the layer, z indicates a number of kernels included in the layer, and a size of the two-dimensional weight matrix is (x×y)×z;

divide the two-dimensional weight matrix into a plurality of blocks based on tensor core units of the one or more processors, each block comprising a plurality of weights, wherein the plurality of blocks are directly deployed on the tensor core units of the one or more processors;

select, by a pruning accelerator, a set of blocks from the plurality of blocks for block-wise pruning by minimizing a cost function subject to a pre-determined block-wise constraint, wherein the pre-determined block-wise constraint comprises constraints of hardware implementation, and the cost function comprises regularization terms obtained from a penalty parameter and penalty weights;

add, by the pruning accelerator and using a heuristic algorithm, the pre-determined block-wise constraint to a pruning structure based on the constraints of the hardware implementation, and adjust a Graphics Processing Unit (GPU) pipeline according to the pruning structure with the pre-determined block-wise constraint added; wherein a block-wise pruned weight matrix is generated by setting one or more weights in the set of blocks to zero, wherein the heuristic algorithm adds the pre-determined block-wise constraint on a number of non-zero elements, wherein the pruning accelerator prunes the neural network by selecting neurons to be pruned based on the pre-determined block-wise constraint; and wherein the one or more audio feature sequences are generated from an external audio signal received from an audio component comprising a microphone.

13. The apparatus of claim 12, wherein the one or more processors are further configured to:
obtain one or more remaining blocks from the plurality of blocks, wherein the one or more remaining blocks are not included in the set of blocks, and at least one weight in the one or more remaining blocks remain non-zero;
wherein the pre-determined block-wise constraint is based on a number of the one or more remaining blocks; and
wherein the block-wise pruned weight matrix is generated by setting the one or more weights in the set of blocks to zero comprises:
the block-wise pruned weight matrix is generated by setting all weights in the set of blocks to zero.

14. The apparatus of claim 13, wherein the pre-determined block-wise constraint is based on the one or more remaining blocks further comprises:
the pre-determined block-wise constraint comprises that the number of the one or more remaining blocks is no greater than a first pre-determined threshold.

15. The apparatus of claim 12, wherein setting the one or more weights in the set of blocks to zero comprises:
selecting at least one column and at least one row from the plurality of blocks by minimizing a cost function subject to a pre-determined block-wise row and column constraint, each block comprising a plurality of columns and a plurality of rows; and
setting all weights in the at least one column and the at least one selected row to zero; and
wherein the pre-determined block-wise row and column constraint comprises that a number of one or more rows selected from the plurality of blocks and one or more columns selected from the plurality of blocks is no greater than a fourth pre-determined threshold.

16. The apparatus of claim 12, wherein the one or more processors are further configured to:
select the set of blocks from the plurality of blocks for block-wise pruning by using a regularization term, wherein the set of blocks are selected by updating the regularization term using one or more penalty weights.

17. The apparatus of claim 12, wherein a size of each block is determined based on a size of a tensor core unit of the one or more processors.

18. The apparatus of claim 12, wherein the plurality of layers comprises a convolutional layer, and the one or more processors are further configured to:
transform a three-dimensional weight tensor of the convolutional layer to the weight matrix.

19. A non-transitory computer readable storage medium, comprising instructions stored therein, wherein, upon execution of the instructions by one or more processors, the instructions cause the one or more processors to perform acts comprising:
generating a weight matrix for a layer of a plurality of layers in a neural network, wherein the weight matrix comprises a set of weights associated with the layer, the plurality of layers comprises a first layer receiving a first input associated with one or more audio feature sequences, and the plurality of layers are executed on the one or more processors;
transforming the weight matrix organized in a three-dimensional weight tensor to a two-dimensional weight matrix, wherein the three-dimensional tensor has a size that is based on a size of a kernel of the layer and channels of an input of the layer, wherein the size of the three-dimensional tensor is x×y×z, x indicates a square of a width of the kernel, y indicates a depth of the kernel or a number of channels of the input of the layer, z indicates a number of kernels included in the layer, and a size of the two-dimensional weight matrix is (x×y)×z;
dividing the two-dimensional weight matrix into a plurality of blocks based on tensor core units of the one or more processors, each block comprising a plurality of weights, wherein the plurality of blocks are directly deployed on the tensor core units of the one or more processors;
selecting, by a pruning accelerator, a set of blocks from the plurality of blocks for block-wise pruning by minimizing a cost function subject to a pre-determined block-wise constraint, wherein the pre-determined block-wise constraint comprises constraints of hardware implementation, and the cost function comprises regularization terms obtained from a penalty parameter and penalty weights;
adding, by the pruning accelerator and using a heuristic algorithm, the pre-determined block-wise constraint to a pruning structure based on the constraints of the hardware implementation, and
adjusting a Graphics Processing Unit (GPU) pipeline according to the pruning structure with the pre-determined block-wise constraint added; wherein a block-wise pruned weight matrix is generated by setting one or more weights in the set of blocks to zero,
wherein the heuristic algorithm adds the pre-determined block-wise constraint on a number of non-zero elements, wherein the pruning accelerator prunes the neural network by selecting neurons to be pruned based on the pre-determined block-wise constraint; and
wherein the one or more audio feature sequences are generated from an external audio signal received from an audio component comprising a microphone.

20. The non-transitory computer readable storage medium of claim 19, wherein the instructions cause the one or more processors to perform acts further comprising:
obtaining one or more remaining blocks from the plurality of blocks, wherein the one or more remaining blocks are not included in the set of blocks, and at least one weight in the one or more remaining blocks remain non-zero;
wherein the pre-determined block-wise constraint comprises that a number of the one or more remaining blocks is no greater than a first pre-determined threshold; and
wherein the block-wise pruned weight matrix is generated by setting the one or more weights in the set of blocks to zero comprises:
the block-wise pruned weight matrix is generated by setting all weights in the set of blocks to zero.

* * * * *